United States Patent Office 3,276,360

Patented Oct. 4, 1966

3,276,360

LITHOGRAPHIC IMAGE LACQUER

Ronald M. Stimson and Gilden R. Van Norman, Rochester, N.Y., assignors to Eastman Kodak Company, Rochester, N.Y., a corporation of New Jersey No Drawing. Filed May 17, 1965, Ser. No. 456,508
20 Claims. (Cl. 101—149.2)

This invention relates to planographic printing plate lacquers.

In the preparation of lithographic printing plates, it is customary to expose a light-sensitive, resinous material to light after which the unhardened resin is removed from the plate. In some systems, the unhardened resin is in the exposed areas, whereas in the commonly used negative printing plates, the unhardened areas are in the unexposed portions of the plate. The resin which is left on the printing plate is then lacquered to give a long-wearing printing surface. These lacquers must have characteristics which permit their adsorption in the hydrophobic areas without leaving a residual oil-phase material in the non-image areas. These lacquers should be inert to the action of ink, ink solvents, and the fountain solution chemicals including water. They should be non-blinding in the image areas and be non-tacky and scratch-resistant during and after processing.

Many of the prior art lacquers have been useful in providing some of the necessary characteristics but have not been entirely satisfactory in all respects. Therefore, there has been a need for improved lacquers, particularly those which would have wide adaptability for various light-sensitive coatings including the diazo resins which are commonly used and which may be obtained on presensitized printing plates. They should be adaptable to other light-sensitive resins used in lithography as well as to the dichromate-albumen type coatings.

We have found a lacquer for use on lithographic printing plates which can be applied to the image areas of both negative and positive type printing plates which provides longer press life and which has other desirable printing characteristics.

One object of this invention is to provide a lacquer for image areas on lithographic printing plate which overcomes the difficulties experienced with prior art lacquers. Another object is to provide a lacquer which provides an intensely colored image by being preferentially adsorbed in the hydrophobic areas. A further object is to provide a lacquer which gives a sharp cut off at the boundary of the image and the non-image areas and which leaves no residual colored, oil-phased material in the non-imaged areas. A still further object is to provide a lacquer which shows no evidence of bridging across the very small non-imaged dots in half-tone areas of high print density. A still further object is to provide a lacquer which can be used with lithographic images obtained by various types of light-sensitive resins including solvent soluble types and which shows good wearing characteristics on the press, is non-blinding in the image areas and non-tacky and scratch-resistant during and after processing. Another object is to provide a lacquer which, prior to drying, can be diluted with water without any adverse effects, and which is inert to the action of the ink, ink solvents, and fountain solution chemicals. Additional objects will be apparent from the following description.

Lacquer for use with lithographic printing plates customarily contains an aqueous phase and a non-aqueous liquid phase. The water phase contains a soluble thickener, whereas the non-aqueous phase contains a resinous material. We have found that unexpected beneficial properties are obtained by using a vinylidene chloride-acrylonitrile copolymer as the resinous material in the non-aqueous phase.

In one embodiment of our invention, a two-phase system is used comprising an aqueous phase and a solvent phase. A particularly useful material as the incorporated thickener in the aqueous phase is a copolymer of maleic anhydride and vinyl methyl ether in the amide form. However, other thickeners may be used such as polysaccharides, including polysaccharide compounds from natural sources, such a seaweed derivatives and the like. Other polysaccharides include those identified as polysaccharide carboxy ethers. Gum arabic is also useful as is carboxymethyl cellulose. For some purposes, a wetting agent such as sodium lauryl sulfate may be included. In the solvent phase, a solvent which is usefully water immiscible is employed which contains the vinylidene chloride-acrylonitrile copolymer. A color material such as a dye, pigment, or lake is also incorporated in the solvent phase. The aqueous phase and the solvent phase are combined and emulsified using conventional equipment such as a variable speed impeller type mixer.

It will be appreciated that the resulting emulsion can be either a water-in-oil emulsion or an oil-in-water emulsion. For some purposes it will be preferable to have an aqueous external phase comprising water and a soluble thickener with an internal non-aqueous liquid phase comprising the vinylidene chloride-acrylonitrile copolymer and water-immiscible volatile solvent. For other purposes, it will be desirable to have an internal aqueous phase comprising water and a soluble thickener and an external non-aqueous liquid resinous phase comprising the vinylidene chloride-acrylonitrile copolymer and an immiscible volatile solvent.

After the light-sensitive resin, such as that obtained on a presensitized diazo plate has been exposed and processed with a suitable solution to remove the soluble areas, the lacquer is applied while the plate is wet and rubbed into the image areas to produce a uniform and sharply delineated image. After removing the excess lacquer, the plate is dried and placed on the press, inked, and used to prepare lithographic prints.

The vinylidene chloride-acrylonitrile polymer may be prepared by known methods such as emulsion polymerization or the like. It may have a vinylidene-chloride content which can be varied. A useful range has from 60–80% vinylidene chloride with the balance being acrylonitrile. However, it will be appreciated that other ratios may be used providing they are sufficiently soluble in the solvent phase. The molecular weight of the resulting polymer may also be varied but a useful molecular weight range is characterized by an inherent viscosity of from 0.14 to 0.20 deciliter/gram in dimethyl formamide.

An extender may be used in the solvent phase as an addition to or partial substitute for the vinylidene chloride-acrylonitrile copolymer to vary the processing characteristics of the lacquer. Useful extender compounds include plasticizers for resins such as, for example dioctyl phthalate, etc. A particularly useful compound is a para toluene sulfonamide formaldehyde condensate. Up to 50% of the copolymer may be substituted by a suitable extender.

The coloring matter can be a dye, a pigment, or a lake or a combination of these providing it is preferentially wet by the oleophilic binder or the solvent and provides a color which delineates the image. A large number of these compounds are useful but a phthalocyanine blue pigment, such as (Color Index No. 74160) Bahama Blue Lake, is particularly useful due to the ease of dispersing and wetting, uniformity of the dispersion, etc.

The immiscible solvent used for the oil phase is a matter of choice providing that it is a solvent for the vinylidene chloride-acrylonitrile copolymer and is immiscible in water. A particular choice may also depend upon toxic properties, volatility, and the like. However, a particularly useful solvent is 3-heptanone. Other useful solvents include other ketones, etc., mixtures of solvents, etc.

The lithographic printing plates on which these lacquers may be used include those prepared by diazo resins as well as other light-sensitive coatings including the solvent-soluble types. Once the image has been obtained, the lacquer of our invention can be used to improve the thickness of the image, its printing properties and the like. These images may be on metal supports, such as aluminum, zinc, etc. or on other types of supports, such as paper, polymeric substrates made of synthetic material such as polyesters, polyolefins, polystyrenes, etc.

The following examples are intended to illustrate our invention but not to limit it in any way:

*Example 1*

In a 1-liter round-bottom fluted 3-neck flask equipped with a variable speed impeller stirrer and a cold water condenser was placed the following:

| | | |
|---|---|---|
| Water | ml | 400 |
| Lauryl alcohol sulfate | gm | 4 |
| Vinylidene chloride | gm | 75 |
| Acrylonitrile | gm | 25 |
| 1-dodecanethiol | gm | 4 |
| Potassium persulfate | gm | 1 |
| Sodium bisulfite | gm | 1.25 |

The flask was themostatted at 30° C. and the contents stirred for 6 hours. Stirring was discontinued and the contents allowed to stand at 30° C. overnight. The emulsion was coagulated by pouring into an equal volume of 2 percent sodium chloride solution. The coagulated resin exists in very fine particles and is isolated by filtering through a paper filter using a Büchner funnel. The resulting polymer is washed and filtered twice more and dried at 140° F.

The apparent inherent viscosity (0.25 g./100 ml.) in N,N-dimethyl formamide is 0.15. The yield is quantitative.

At a level of 2.5 g. of 1-dodecanethiol a polymer of inherent viscosity=0.19 is obtained. Increasing the concentration of 1-dodecanethiol above 4 gms. does not produce a polymer with an inherent viscosity below 0.15.

*Example 2*

The following lacquer formulation was prepared:

| | Percent |
|---|---|
| Bahama Blue (Color Index No. 74160) | 3.0 |
| Vinylidene chloride-acrylonitrile copolymer IV =.14 to .18 | 3.0 |
| Para toluene sulfonamide-formaldehyde resin | 3.0 |
| Coconut oil acid ester of sodium isethionate | 0.15 |
| 3-heptanone | 20.0 |
| Lauryl alcohol sulfate | 0.75 |
| Copolymer of maleic anhydride and vinyl methyl ether in the amide form | 0.75 |
| Water | 69.35 |

The pigment, vinylidene chloride-acrylonitrile copolymer, p-toluene sulfonamide-formaldehyde resin, coconut oil acid ester and 3-heptanone are ball-milled for 16–20 hours in a porcelain jar containing ¾ inch porcelain cylinders at 75° F. This system is then added, with efficient mixing, to the water-lauryl alcohol sulfate-maleic anhydride copolymer solution and stirred for 8–10 minutes. No pH adjustment is necessary; lacquer pH is about 7.3. If desired, part of the copolymer, p-toluenesulfonamide-formaldehyde resin and 3-heptanone may be left out of the mill-grind and added after the milling operation.

This lacquer, when applied to and rubbed into a presensitized diazo grained aluminum plate after a suitable exposure through negative copy and after processing with a suitable desensitizing solution and while still wet therefrom produced a uniform and a sharply delineated blue-image very quickly. No bridging was found in those areas wherein this phenomena would be most suspect. The dried plate ran 60,000+ copies on a lithographic press under conditions that are considered normal and representative.

In a similar manner as in Example 2, the following lacquer formulations were prepared and used on lithographic plates.

*Example 3*

| | Percent |
|---|---|
| Naphthanil Red Dark RT539D | 2 |
| Vinylidene chloride-acrylonitrile copolymer | 4 |
| Formaldehyde-p-toluene sulfonamide | 4 |
| Coconut oil acid ester of sodium isethionate | 0.1 |
| 3-heptanone | 20 |
| Sodium lauryl sulfate | 0.75 |
| Polysaccharide gum | 0.40 |
| Water | 68.75 |

*Example 4*

| | Percent |
|---|---|
| Monastral Blue BF (BT425D) (Color Index No. 74160) | 1.5 |
| Vinylidene chloride-acrylonitrile copolymer | 4 |
| Formaldehyde-p-toluene sulfonamide | 4 |
| Coconut oil acid ester of sodium isethionate | 0.075 |
| 3-heptanone | 20 |
| Sodium lauryl sulfate | 0.25 |
| Polysaccharide gum | 0.20 |
| Water | 70 |

*Example 5*

| | Percent |
|---|---|
| Monastral Blue BF (Color Index No. 74160) | 1.5 |
| Vinylidene chloride-acrylonitrile copolymer | 4 |
| p-Toluene sulfonamide formaldehyde resin | 4 |
| Coconut oil acid ester of sodium isethionate | 0.075 |
| 3-heptanone | 20 |
| Sodium lauryl sulfate | 0.75 |
| Polyacrylic acid | 0.50 |
| Water | 69.18 |

*Example 6*

| | Percent |
|---|---|
| Monastral Blue BF (Color Index 74160) | 1.5 |
| Vinylidene chloride-acrylonitrile copolymer | 4 |
| p-Toluene sulfonamide formaldehyde resin | 4 |
| Coconut oil acid ester of sodium isethionate | 0.075 |
| 3-heptanone | 35 |
| Sodium lauryl sulfate | 0.75 |
| Vinyl methyl ether-maleic anhydride half amide ammonium salt | 1.0 |
| Water | 53.68 |

*Example 7*

| | Percent |
|---|---|
| Monastral Blue BF (Color Index No. 74160) | 1.75 |
| Vinylidene chloride-acrylonitrile copolymer | 3 |
| p-Toluene sulfonamide formaldehyde resin | 3 |
| Coconut oil acid ester of sodium isethionate | .087 |
| 3-heptanone | 20 |
| Sodium lauryl sulfate | 0.75 |
| Vinyl methyl ether-maleic anhydride copolymer half amide ammonium salt | 0.75 |
| Water | 70.66 |

*Example 8*

| | Percent |
|---|---|
| Bahama Blue (Color Index No. 74160) | 3 |
| Vinylidene chloride-acrylonitrile copolymer | 3 |
| Coconut oil acid ester of sodium isethionate | .15 |
| 3-heptanone | 20.5 |
| Sodium luaryl sulfate | 0.75 |
| Vinyl methyl ether-maleic anhydride copolymer half amide ammonium salt | 0.75 |
| Water | 71.85 |

*Example 9*

| | Percent |
|---|---|
| Monastral Blue BF (Color Index No. 74160) | 2 |
| Vinylidene acrylonitrile-acrylonitrile copolymer | 2 |
| p-Toluene sulfonamide formaldehyde resin | 2 |
| Coconut oil acid ester of sodium isethionate | .04 |
| 3-heptanone | 20 |
| Sorbitan monopalmitate | .15 |
| Sorbitan monooleate | .60 |
| Vinyl methyl ether-maleic acid copolymer half amide ammonium salt | 0.75 |
| Water | 72.46 |

*Example 10*

| | Percent |
|---|---|
| Monastral Blue BF (Color Index No. 74160) | 2 |
| Vinylidene acrylonitrile-acrylonitrile copolymer | 2 |
| p-Toluene sulfonamide formaldehyde resin | 2.0 |
| Coconut oil acid ester of sodium isethionate | 0.1 |
| Methyl isobutyl ketone | 20 |
| Sodium lauryl sulfate | 0.5 |
| Vinyl methyl ether-maleic acid copolymer half amide ammonium salt | 0.75 |
| Water | 72.65 |

*Example 11*

| | Percent |
|---|---|
| Monastral Blue BF (Color Index No. 7416) | 2.5 |
| Vinylidene chloride-acrylonitrile copolymer | 2 |
| p-Toluene sulfonamide formaldehyde resin | 2 |
| Coconut oil acid ester of sodium isethionate | .05 |
| Methyl isoamyl ketone | 25 |
| Sodium lauryl sulfate | 0.50 |
| Vinyl methyl ether-maleic anhydride copolymer half amide ammonium salt | 0.75 |
| Water | 67.20 |

All percentages used herein are by weight.

The lacquer of our invention can be applied to lithographic printing plates having images thereon produced from various light sensitive resins. Longer wearing plates are obtained on which the image areas are clearly delineated and which are particularly receptive to greasy printing inks. The composition and application is particularly advantageous with lithographic plates of the type described in the Houle et al. application Serial No. 347,931.

The invention has been described in considerable detail with particular reference to preferred embodiments thereof, but it will be understood that variations and modifications can be effected within the spirit and scope of the invention as described hereinabove and as defined in the appended claims.

We claim:

1. A lithographic printing plate image lacquer comprising a colored, two-phase liquid composition, having an aqueous phase comprising water and a soluble thickener, and a non-aqueous liquid, resinous phase comprising a vinylidene chloride-acrylonitrile copolymer, and a water-immiscible volatile solvent.

2. A lithographic printing plate image lacquer comprising a colored, two-phase liquid composition having an internal aqueous phase comprising water and a soluble thickener, and an external non-aqueous liquid resinous phase comprising a vinylidene chloride-acrylonitrile copolymer and a water-immiscible volatile solvent.

3. A lithographic printing plate image lacquer comprising a colored, two-phase liquid composition having an external aqueous phase comprising water, a wetting agent and a soluble thickener, and an internal non-aqueous liquid resinous phase comprising a vinylidene chloride-acrylonitrile copolymer, and a water-immiscible volatile solvent.

4. A lithographic printing plate image lacquer comprising a colored two-phase liquid composition having an aqueous phase comprising water and a soluble thickener, and a non-aqueous liquid resinous phase comprising a vinylidene chloride-acrylonitrile copolymer, a water-immiscible volatile solvent, and an extender for the copolymer.

5. A lithographic printing plate image lacquer comprising a two-phase liquid composition having a liquid aqueous phase and a liquid non-aqueous phase, said non-aqueous phase comprising a pigment and a solution of a volatile water-immiscible solvent and vinylidene chloride-acrylonitrile copolymer.

6. A lithographic printing plate image lacquer comprising a colored two-phase liquid composition having an aqueous phase comprising water and a water soluble copolymer of vinyl methyl ether and maleic anhydride, and a non-aqueous liquid resinous phase comprising a vinylidene chloride-acrylonitrile copolymer, and a water-immiscible volatile solvent.

7. A lithographic printing plate image lacquer comprising a colored, two-phase liquid composition having an internal aqueous phase comprising water and a water-soluble copolymer of vinyl methyl ether and maleic anhydride, and an external non-aqueous liquid resinous phase comprising a vinylidene chloride-acrylonitrile copolymer and a water-immiscible volatile solvent.

8. A lithographic printing plate image lacquer comprising a colored, two-phase liquid composition having an external aqueous phase comprising water, a wetting agent and a water-soluble copolymer of vinyl methyl ether and maleic anhydride, and an internal non-aqueous liquid resinous phase comprising vinylidene chloride-acrylonitrile copolymer, and a water-immiscible volatile solvent.

9. A lithographic printing plate image lacquer comprising a colored, two-phase liquid composition having an aqueous phase comprising water and a water-soluble copolymer of vinyl methyl ether and maleic anhydride, and a non-aqueous liquid resinous phase comprising a vinylidene chloride-acrylonitrile copolymer, a water-immiscible volatile solvent, and an extender for the copolymer.

10. A lithographic printing plate image lacquer comprising a colored, two-phase liquid composition having an aqueous phase comprising water-soluble, polysaccharide thickener, and a non-aqueous liquid resinous phase comprising a vinylidene chloride-acrylonitrile copolymer, and a water-immiscible volatile solvent.

11. A lithographic printing plate image lacquer comprising a colored, two-phase liquid composition having an internal aqueous phase comprising water and a soluble polysaccharide thickener, and an external non-aqueous liquid resinous phase comprising a vinylidene chloride-acrylonitrile copolymer and a water-immiscible volatile solvent.

12. A lithographic printing plate image lacquer comprising a colored, two-phase liquid composition having an external aqueous phase comprising water, a wetting agent and a soluble polysaccharide thickener, and an internal non-aqueous liquid resinous phase comprising vinylidene chloride-acrylonitrile copolymer, and a water-immiscible volatile solvent.

13. A lithographic printing plate image lacquer comprising a colored, two-phase liquid composition having an aqueous phase comprising water and a soluble polysaccharide thickener, and a non-aqueous liquid resinous phase comprising a vinylidene chloride-acrylonitrile copolymer, and a water-immiscible volatile solvent, and an extender for the copolymer.

14. A lithographic printing plate image lacquer comprising a colored, two-phase liquid composition, having an aqueous phase comprising water and a soluble thickener, and a non-aqueous liquid, resinous phase comprising a vinylidene chloride-acrylonitrile copolymer, and a water-immiscible volatile solvent containing at least 50% 3-heptanone.

15. A process of lacquering a lithographic image on a lithographic plate comprising applying the lacquer while the plate is wet, rubbing the lacquer into the image areas and removing excess lacquer, said lacquer comprising a colored, two-phase liquid composition having an internal aqueous phase comprising water and a soluble thickener, and an external non-aqueous liquid resinous phase comprising a vinylidene chloride-acrylonitrile copolymer and a water-immiscible volatile solvent.

16. A process of lacquering a lithographic image on a lithographic plate comprising applying the lacquer while the plate is wet, rubbing the lacquer into the image areas and removing excess lacquer, said lacquer comprising a colored, two-phase liquid composition having an aqueous phase comprising water, a wetting agent and a soluble vinyl methyl ether-maleic anhydride copolymer thickener, and a non-aqueous liquid resinous phase comprising a vinylidene chloride-acrylonitrile copolymer and a water-immiscible volatile solvent.

17. A process of lacquering a lithographic image on a lithographic plate comprising applying the lacquer while the plate is wet, rubbing the lacquer into the image areas and removing excess lacquer, said lacquer comprising a colored, two-phase liquid composition having an aqueous phase comprising water and a soluble thickener, and a non-aqueous liquid, resinous phase comprising a vinylidene chloride-acrylonitrile copolymer, a water-immiscible volatile solvent, and an extender for the copolymer.

18. A process of lacquering a lithographic image on a lithographic plate comprising applying the lacquer while the plate is wet, rubbing the lacquer into the image areas and removing excess lacquer, said lacquer comprising a two-phase liquid composition having a liquid aqueous phase and a liquid non-aqueous phase, said non-aqueous phase comprising a pigment and a solution of a volatile water-immiscible solvent and vinylidene chloride-acrylonitrile copolymer.

19. A process of lacquering a lithographic image on a lithographic plate comprising applying the lacquer while the plate is wet, rubbing the lacquer into the image areas and removing excess lacquer, said lacquer comprising a colored, two-phase liquid composition, having an aqueous phase comprising water and a soluble polysaccharide thickener, and a non-aqueous liquid, resinous phase comprising a vinylidene chloride-acrylonitrile copolymer and a water-immiscible volatile solvent.

20. A process of lacquering a lithographic image on a lithographic plate comprising applying the lacquer while the plate is wet, rubbing the lacquer into the image areas and removing excess lacquer, said lacquer comprising a colored, two-phase liquid composition having an aqueous phase comprising water and a soluble thickener, and a non-aqueous liquid resinous phase comprising a vinylidene chloride-acrylonitrile copolymer, and a water-immiscible volatile solvent.

References Cited by the Examiner

UNITED STATES PATENTS

| | | | |
|---|---|---|---|
| 2,865,873 | 12/1958 | Hodgins | 101—149.2 |
| 3,019,105 | 1/1962 | Adams | 101—149.2 |

ROBERT E. PULFREY, *Primary Examiner.*

JANYCE A. BELL, *Assistant Examiner.*